US006985978B1

(12) United States Patent
Chen et al.

(10) Patent No.: US 6,985,978 B1
(45) Date of Patent: Jan. 10, 2006

(54) METHOD OF OPTIMIZING TOPOLOGY OF IEEE 1394 SERIAL BUS

(75) Inventors: Wei Chen, Seoul (KR); Yun-Gik Lee, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/485,443

(22) PCT Filed: Jun. 12, 1999

(86) PCT No.: PCT/KR99/00291

§ 371 (c)(1),
(2), (4) Date: May 1, 2000

(87) PCT Pub. No.: WO99/64943

PCT Pub. Date: Dec. 16, 1999

(30) Foreign Application Priority Data

Jun. 12, 1998 (KR) .................................. 98-21903

(51) Int. Cl.
*G06F 13/00* (2006.01)
(52) U.S. Cl. ....................... 710/100; 340/2.1; 340/2.7; 340/825.5; 340/825.51
(58) Field of Classification Search ................ 710/100, 710/107, 105, 2, 30, 8; 709/226, 228, 227; 370/221, 438, 458, 463; 719/3; 340/2.1, 340/2.7, 825.5, 825.51
See application file for complete search history.

(56) References Cited

U.S. PATENT DOCUMENTS

| 5,020,059 | A | * | 5/1991 | Gorin et al. ................... 714/3 |
| 5,533,198 | A | * | 7/1996 | Thorson ....................... 370/221 |
| 5,559,967 | A | * | 9/1996 | Oprescu et al. .............. 710/105 |
| 5,687,388 | A | * | 11/1997 | Wooten et al. .................. 710/3 |
| 5,724,517 | A | * | 3/1998 | Cook et al. .................. 709/227 |
| 5,832,300 | A | * | 11/1998 | Lowthert ....................... 710/33 |
| 5,878,232 | A | * | 3/1999 | Marimuthu .................. 709/249 |
| 6,067,298 | A | * | 5/2000 | Shinohara .............. 370/395.71 |
| 6,094,700 | A | * | 7/2000 | Deschepper et al. .......... 710/30 |
| 6,243,395 | B1 | * | 6/2001 | Fujimori et al. ............. 370/466 |
| 6,247,061 | B1 | * | 6/2001 | Douceur et al. ............ 709/240 |
| 6,256,698 | B1 | * | 7/2001 | Zou ........................... 710/113 |
| 6,311,245 | B1 | * | 10/2001 | Klein ......................... 710/107 |
| 6,324,165 | B1 | * | 11/2001 | Fan et al. .................... 370/232 |
| 6,456,631 | B1 | * | 9/2002 | Nomura ...................... 370/466 |

OTHER PUBLICATIONS

IEEE Compuer Society, "IEEE Standard for a High Performance Serial Bus", 1996, pp 35, 243.*
Thomas Corman, Charles Leiserson, Ronald Rivest, "Introduction to Algorithms", 1989, The MIT Press.*

(Continued)

*Primary Examiner*—Glenn A. Auve
*Assistant Examiner*—Justin King
(74) *Attorney, Agent, or Firm*—Sughrue Mion, PLLC

(57) ABSTRACT

A method of optimizing the topology of the IEEE 1394 serial bus having a plurality of nodes each with communication ports, comprises the steps of prioritizing the nodes according to the number of the ports and the transmission speed, connecting a non-used port of the node of the first priority with a port of the node of the second priority, and repeating the previous step until all of the nodes are connected together, whereby the nodes are connected through the ports according to priority order.

5 Claims, 13 Drawing Sheets

OTHER PUBLICATIONS

R.V. Boppana, C.S. Raghavendra, "Minimum Spanning Tree on the Hmesh Architecture", 1988, IEEE.*

J Ahao, S. McKenzei, and A.J. Soper, "A Genetic Algorithm for the Design of Multipoint Connections in a Local Access Netork", 1995, IEEE.*

* cited by examiner

US 6,985,978 B1

METHOD OF OPTIMIZING TOPOLOGY OF IEEE 1394 SERIAL BUS

BACKGROUND OF THE INVENTION

1. Field of the Invention

The present invention relates to the IEEE 1394 network, and more particularly a method of optimizing the topology of the IEEE 1394 serial bus.

2. Description of the Related Art

The IEEE 1394 is a multimedia interface of the next generation for enabling information exchange among various multimedia instruments according to the specification prepared by IEEE (Institute of Electrical and Electronics Engineers), which provides a serial bus standard to enable communication of audio and video data among multimedia instruments such as HD-TV, DVD and DVC, differing from the conventional interface only to allow the connection between the personal computer and peripheral devices such as a mouse, a printer, a scanner, etc. The IEEE 1394 technology has been rapidly developed by engineers practicing electronics, communications and computer technologies, presently providing for a high data transmission speed of 400 Mbps, a plug & play system, 63 nodes on a single bus, etc.

In order to optimize the topology of the IEEE 1394 serial bus the following three methods may be used. First, the cable topology is reconstructed so as to reduce the hop number. Second, the cable topology is reconstructed so as to arrange the nodes of the same speed capacity adjacent to each other. Third, the gap count is optimized for the present cable topology. However, the IEEE 1394 specification only defines the third method to reduce the gap count according to the maximum hop number of the present cable topology.

In the IEEE 1394 cable environment, the nodes are connected in the form of a daisy-chain, as shown in FIG. 1 illustrating the structure of the IEEE 1394 serial bus network using three ports. In the drawing, reference numerals 10, 30 and 40 represent nodes, and 20 represents hop. There are shown 36 nodes existing in a single bus, where the maximum hop number between two nodes, for example, the node numbered 1 and the node numbered 17, becomes 16. In such IEEE 1394 serial bus network as shown in FIG. 1, if there occurs a transmission speed difference between the adjacent nodes, the efficiency of the high speed node (for example, 200 Mbps) may be reduced by the low speed node (for example, 100 Mbps). Hence, in the IEEE 1394 cable environment, it is necessary to connect together all the nodes existing in a single bus and construct the topology for keeping the speed capacity of each node as great as possible.

SUMMARY OF THE INVENTION

It is an object of the present invention to provide a method of optimizing the topology of the IEEE 1394 serial bus, which may connect all the nodes existing in a single bus to keep the speed capacity of each node as great as possible in a network constructed by employing the IEEE 1394 serial bus.

According to an aspect of the present invention, a method of optimizing the topology of the IEEE 1394 serial bus having a plurality of nodes each with communication ports, comprises the steps of prioritizing the nodes according to the number of the ports and the transmission speed, connecting a non-used port of the node of the first priority with a port of the node of the second priority, and repeating the previous step until all of the nodes are connected together, whereby the nodes are connected through the ports according to priority order.

The present invention will now be described more specifically with reference to the drawings attached only by of example.

DETAILED DESCRIPTION OF THE PREFERRED EMBODIMENT

Figure 1:
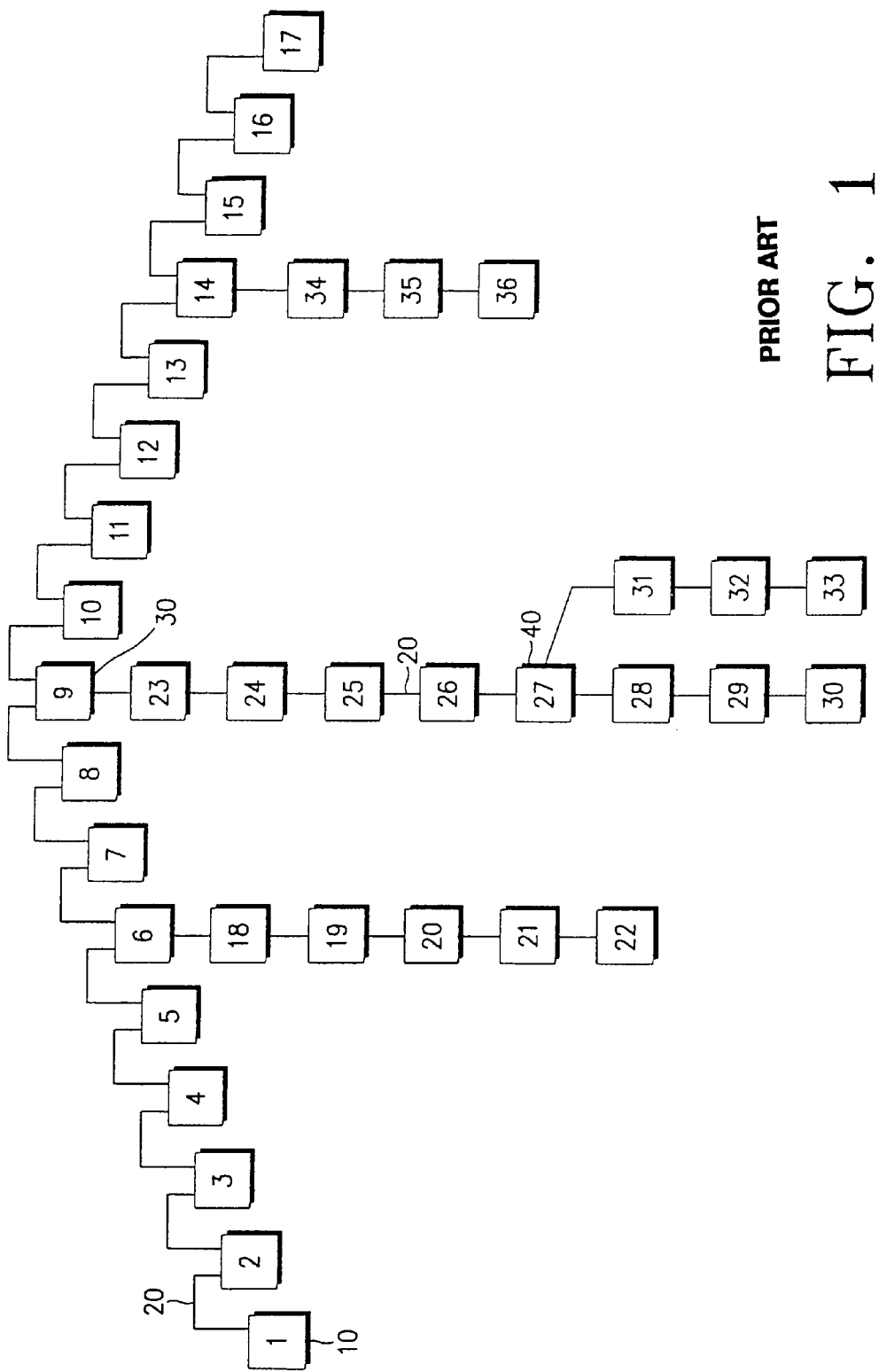
FIG. 1 is a schematic diagram for illustrating the structure of the network of the IEEE 1394 serial bus employing three ports.
Figure 2:
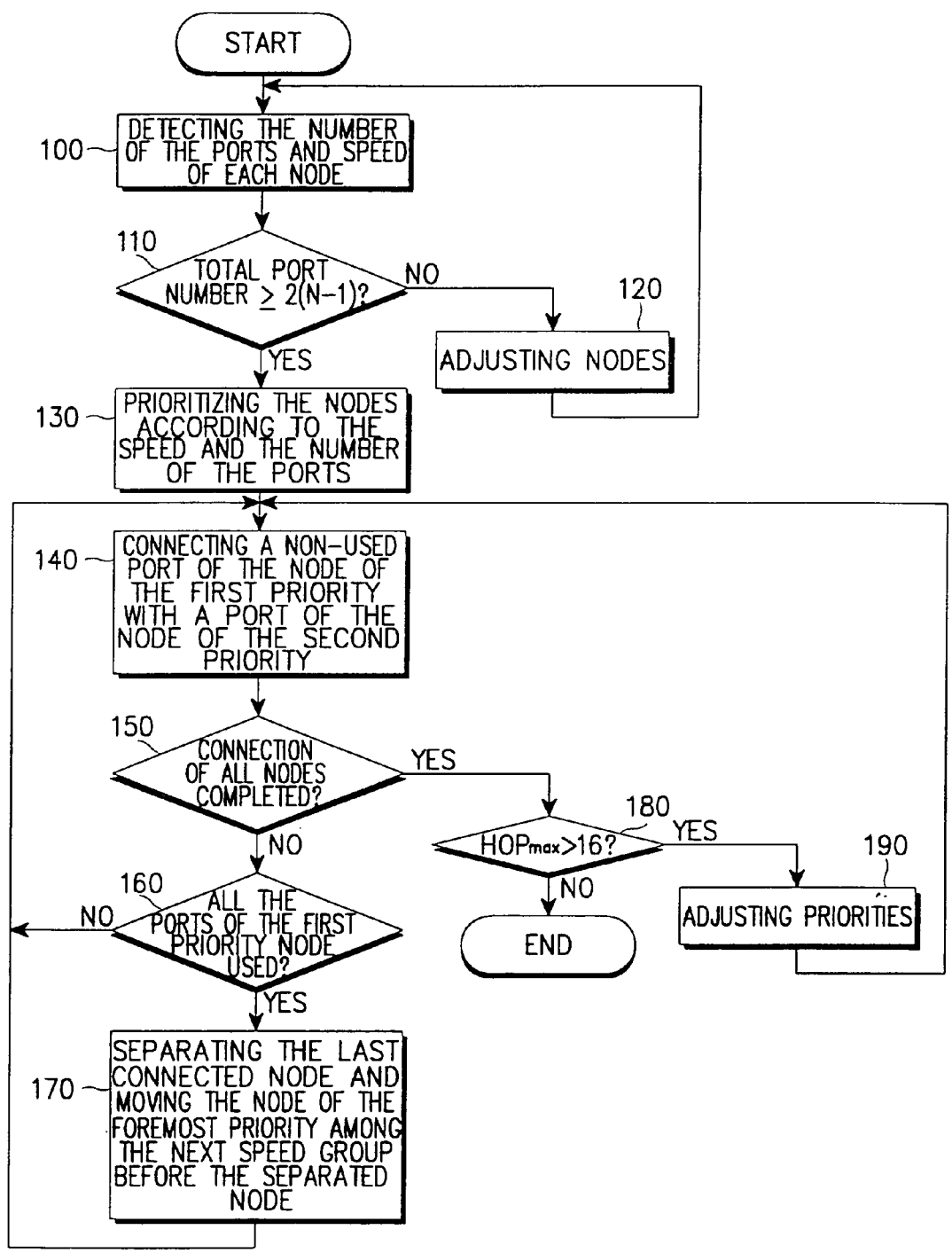
FIG. 2 is a flow chart for illustrating the procedure of optimizing the topology of the serial bus according to the present invention.
Figure 3A:
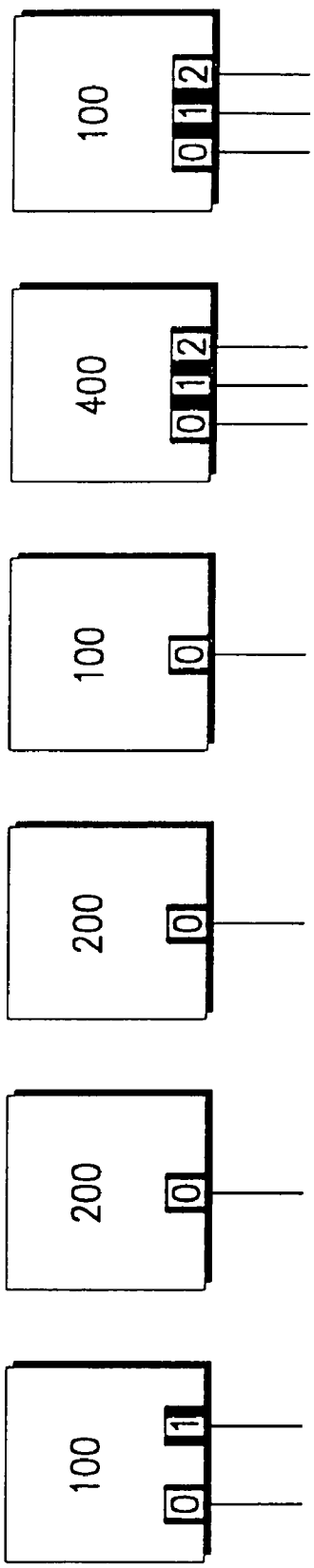
FIGS. 3A to 3E illustrate an example of connecting the nodes according to the flow chart of FIG. 2.
Figure 3B:
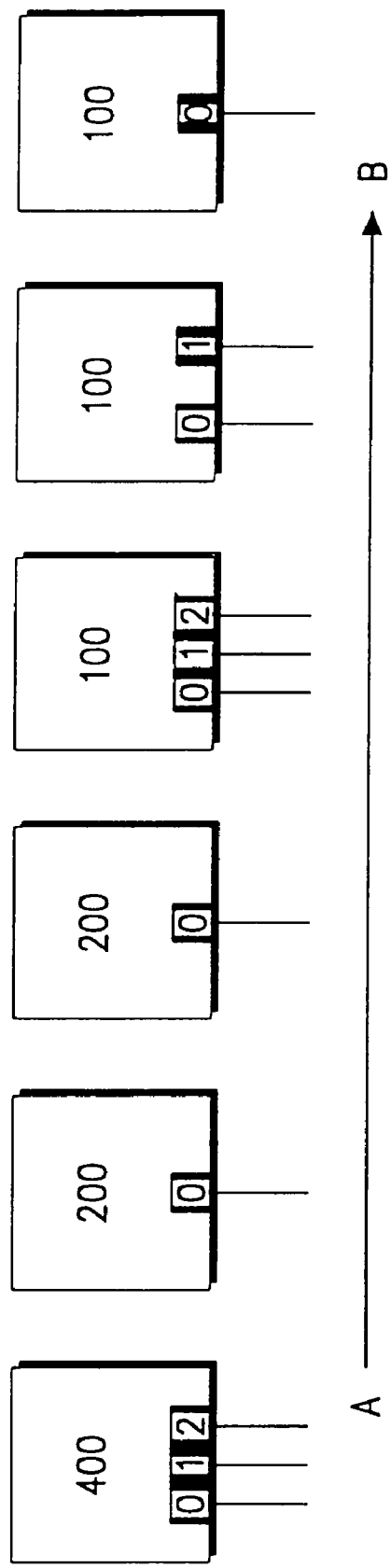

Describing the procedure of optimizing the topology of the IEEE 1394 serial bus in connection with FIG. 3A, there are shown six nodes respectively providing the transmission speeds hereinafter referred to as "speed") of 100 Mbps, 200 Mbps and 400 Mbps. Reference numerals 0, 1, 2 represent the port numbers of each node. Firstly, referring to FIG. 2, the bus controller detecting the number of the ports and speed of each node in step 100. Then, the bus controller determines in step 110 whether the total port number is equal to or greater than 2(N−1), where "N" represents the number of all the nodes. This is to confirm that all the nodes may be connected with the serial bus. In the present embodiment, the number N of the nodes is 6, and the total port number 11, so that the prerequisite of the step 110 is satisfied. In step 130, the nodes are prioritized according to the speed and the number of ports. In this case, the speed is firstly considered, and then the number of ports. As shown in FIG. 3B, the order of priority becomes lower in the direction of the arrow from "A" to "B".

Figure 3C:
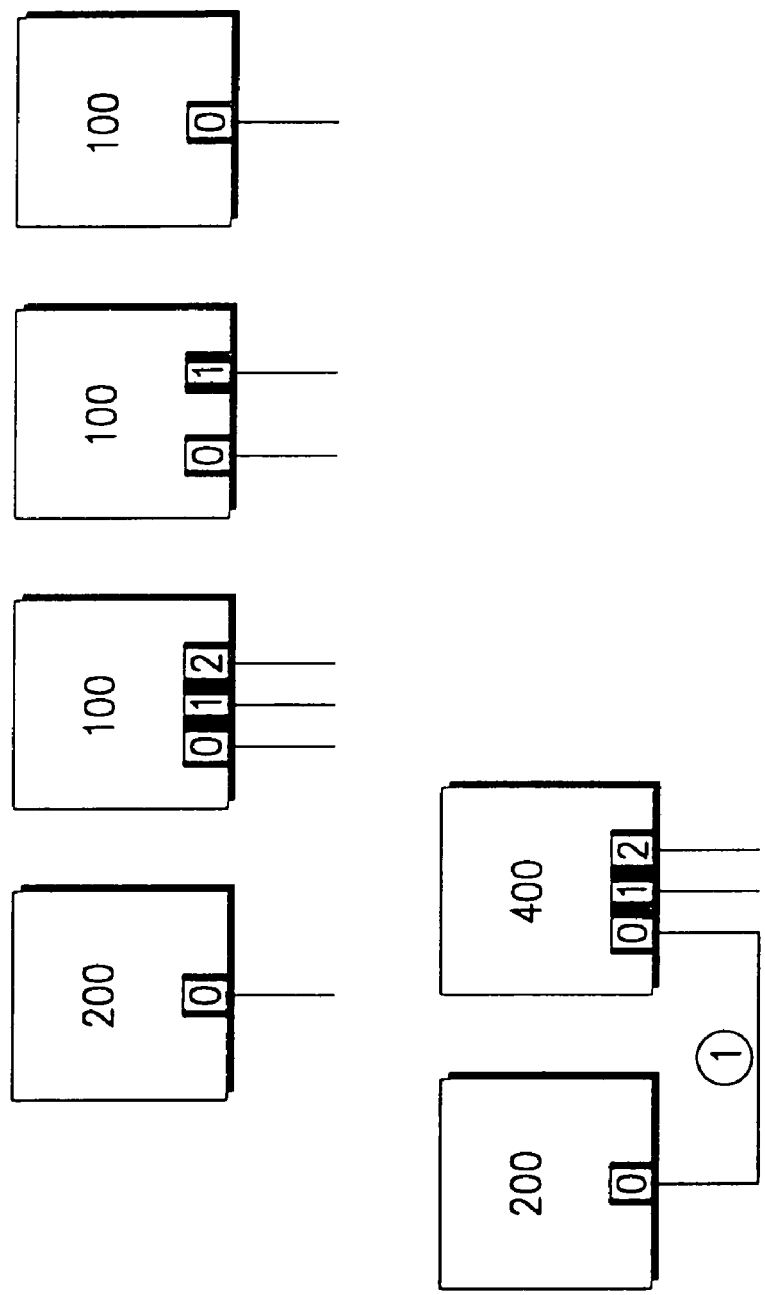
Figure 3D:
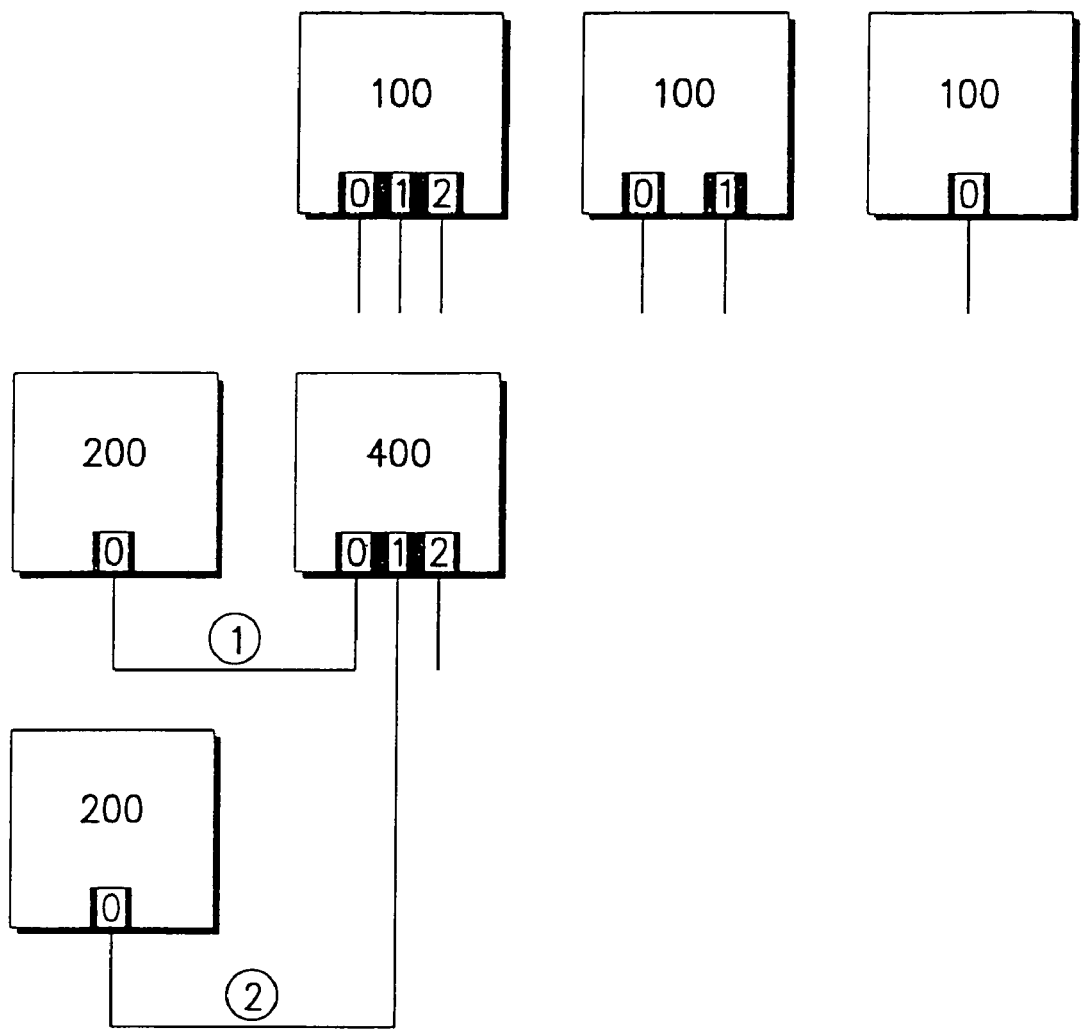
Figure 3E:
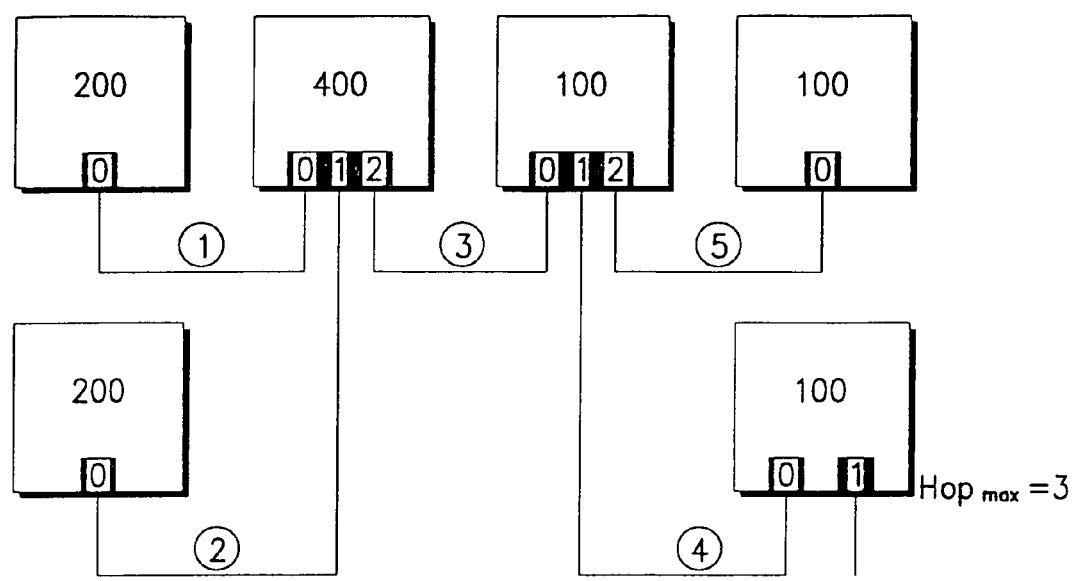

In step 140, a non-used port of the node of the first (higher) priority is connected with a port of the node of the second (lower) priority. Then, the bus controller sequentially repeats the steps 150, 160 and 140. Thus, the node of 400 Mbps having three ports makes the first connection (①) with a node of 200 Mbps having a single port as shown in FIG. 3C, and the second connection with another node of 200 Mbps having a single port as shown in FIG. 3D. Consequently, all the nodes are connected together as represented by the connections (①, ②, ③, ④, ⑤) in FIG. 3E. When it is confirmed in step 150 that all the nodes are completely connected, FIG. 3E shows the optimized topology map, where the maximum hop number $HOP_{max}$ between two nodes has the minimum value ($HOP_{max} = 3$), and the speed capacity of each node is secured.

Figure 4A:
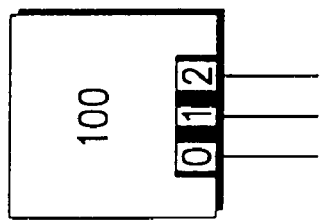
FIGS. 4A to 4F illustrate another example of connecting the nodes according to the flow chart of FIG. 2.
Figure 4A:
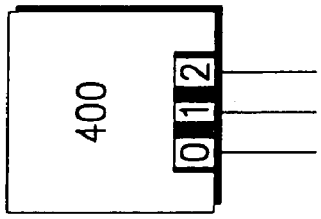
Figure 4A:
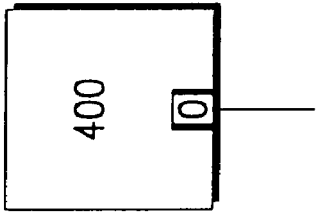
Figure 4A:
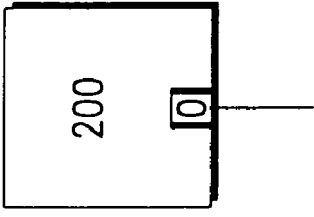
Figure 4A:
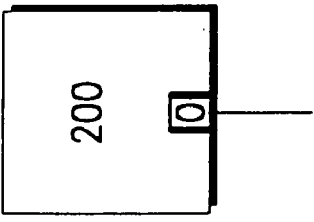
Figure 4A:
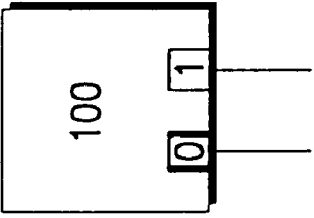
Figure 4B:
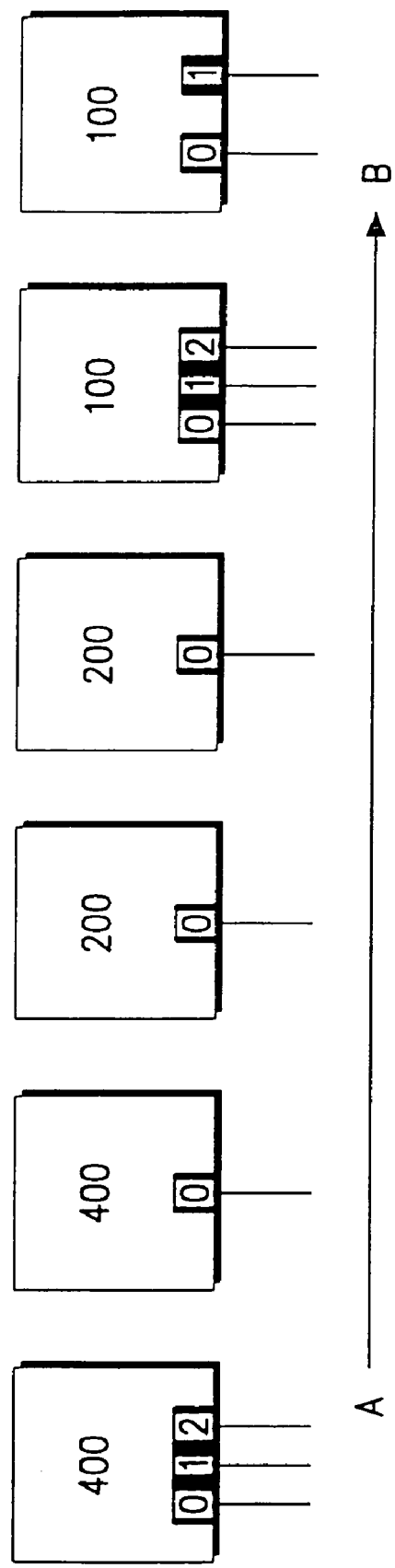

Describing another embodiment of optimizing the topology of the serial bus having six nodes as shown in FIG. 4A, the bus controller determines in step 110 whether the total port number is equal to or greater than 2(N−1). If the total port number is smaller than 2(N−1) indicating that the normal connection of the nodes is impossible, the nodes are adjusted in step 120. In the present embodiment, the node number "N" is 6, and the total port number 11, so that the prerequisite of the step 110 is satisfied. Then, the bus controller goes to step 130 to prioritize the nodes according to the speed and number of the ports, as shown in FIG. 4B. Likewise, the order of priority becomes lower in the direction of arrow from "A" to "B".

Figure 4C:
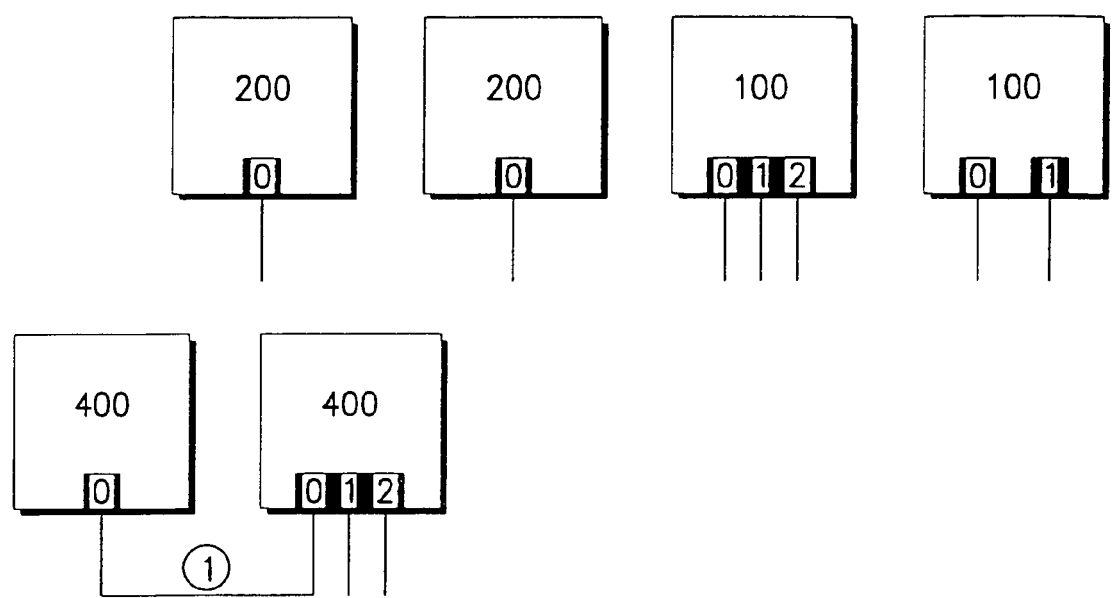
Figure 4D:
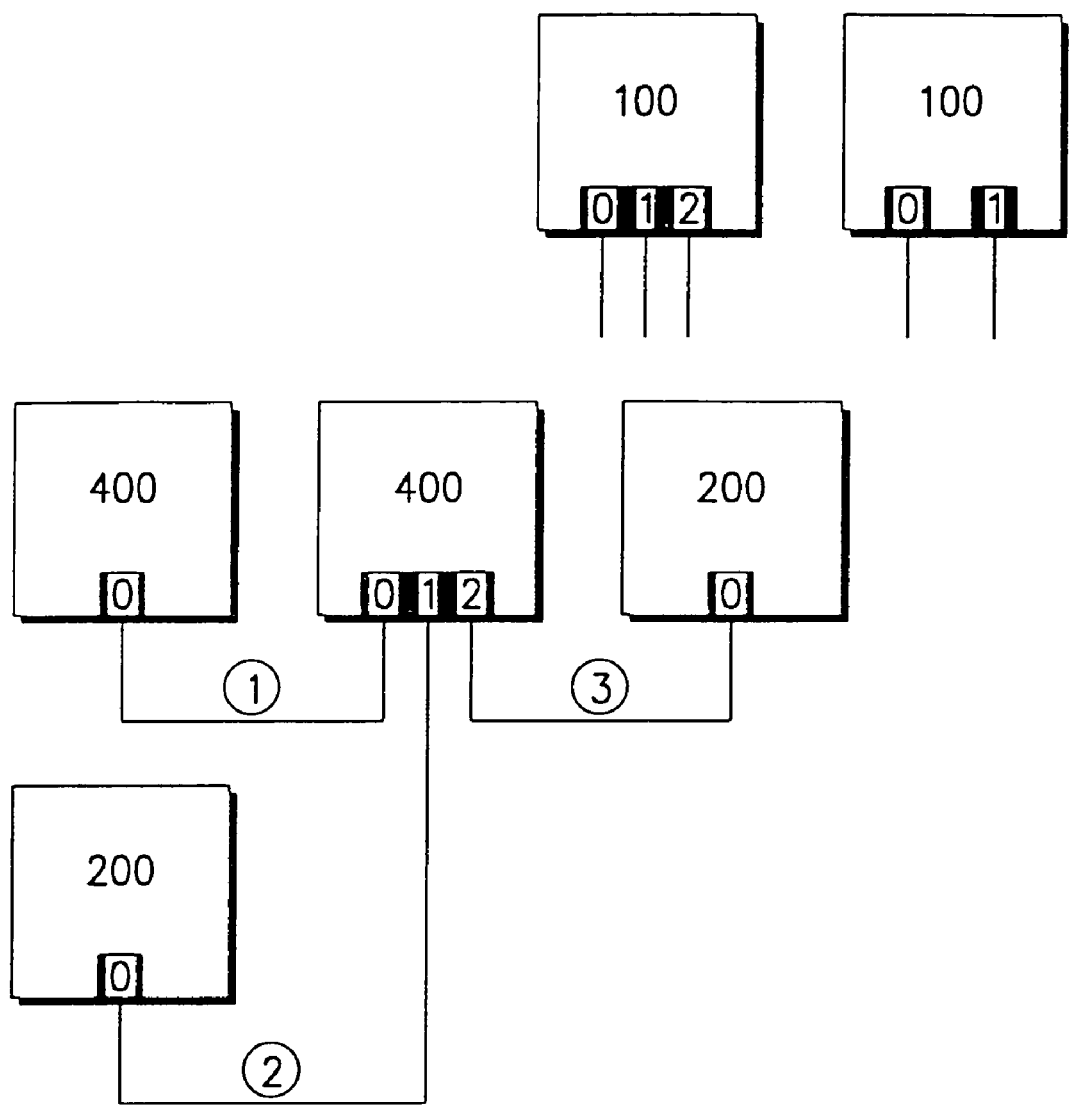

In step 140, a non-used port of the node of the first (higher) priority is connected with a port of the node of the second (lower) priority. Thus, the node of 400 Mbps having three ports makes the first connection (①) with the node of 400 Mbps having a single port as shown in FIG. 4C. The bus controller sequentially repeats the steps 150, 160 and 140 to connect all the nodes. However, the nodes arranged as shown in FIG. 4A may not be normally connected through the steps 140 to 160. Namely, the fourth connection between a node of 200 Mbps and a node of 100 Mbps is impossible since each of 200 Mbps nodes has a single port. More specifically describing in connection with FIG. 4D, the 200 Mbps node may not be connected with the 100 Mbps after making the first, second and third connections ①, ②, ③ between the nodes of 400 Mbps and 200 Mbps.

Figure 4E:
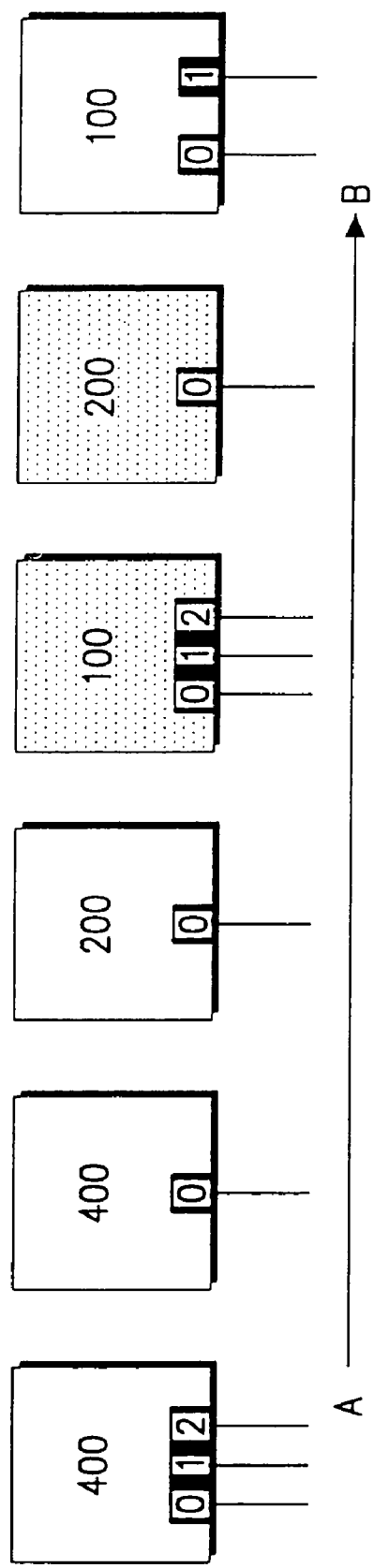
Figure 4F:
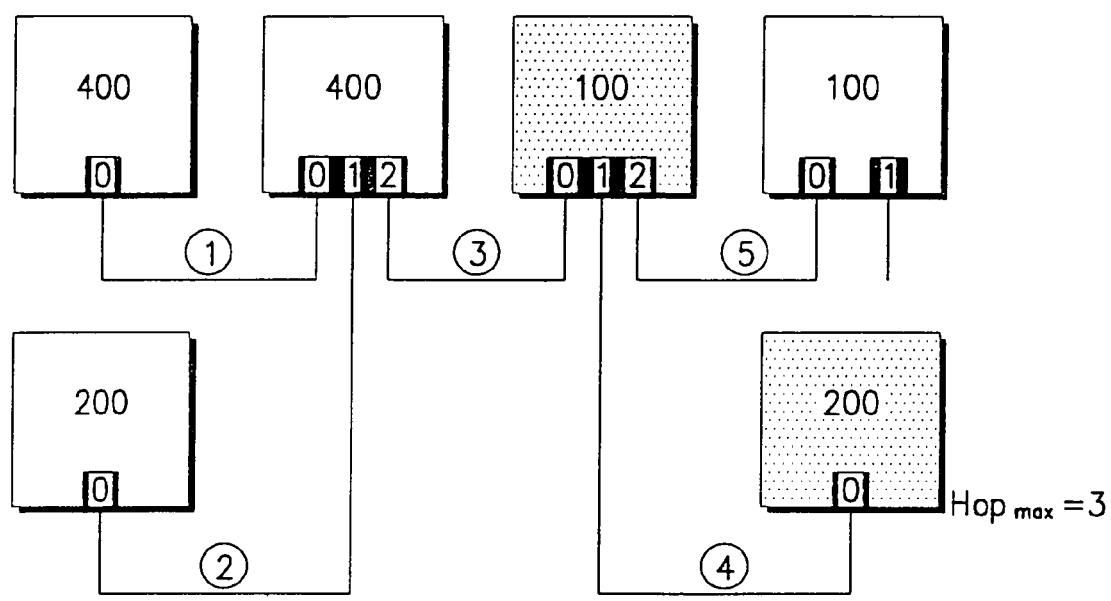

Hence, if the bus controller detects in step 160 that all ports of the node of higher priority are used, it goes to step 170 to separate the last connected node, and then to move the node of foremost priority among the next speed group before the separated node. Accordingly, the priority arrangement of the nodes as shown in FIG. 4B is rearranged as shown in FIG. 4E. Based on the new priority arrangement, the bus controller repeats the steps 140 to 160 to achieve the final connections ①, ②, ③, ④, ⑤ as shown in FIG. 4F. Then, the bus controller goes to step 180 to determine whether the maximum hop number $HOP_{max}$ exceeds 16. If so, the priority order is readjusted in step 190, returning to step 140. In the present embodiment, the maximum hop number $HOP_{max}$ between two arbitrary nodes is 3, satisfying the requirement of the step 180. Hence, in the optimized topology map as shown in FIG. 4E, the maximum hop number $HOP_{max}$ between two nodes has the minimum value ($HOP_{max}=3$), and the speed capacity of each node is secured.

While the present invention has been described with specific embodiments accompanied by the attached drawings, it will be appreciated by those skilled in the art that various changes and modifications may be made thereto without departing from the gist of the present invention.

What is claimed is:

1. A method of optimizing a topology of a serial bus having a plurality of nodes each with communication ports, comprising the steps of:
   prioritizing said nodes according to the number of said communication ports and a transmission speed of said nodes, such that nodes of higher speed have higher priority than nodes of lower speed and nodes of equal speed are prioritized so that nodes having more of said communication ports have a higher priority than nodes having fewer of said communication ports;
   connecting a non-used port of the node of the highest priority with a port of the node of the next priority; and
   repeating the connecting step until all of said nodes are connected together, whereby said nodes are connected through said communication ports according to priority order.

2. A method as defined in claim 1, wherein the step of prioritizing is performed so as to firstly assign higher priority to the node of greater transmission speed, and then to secondly assign higher priority to the node having greater number of said ports.

3. A method of optimizing a topology of a serial bus having a plurality of nodes each with communication ports, comprising the steps of:
   comparing a total number of ports of all of said nodes with a reference value varying with the number (N) of said nodes to determine whether a prerequisite for constructing said topology is satisfied, the prerequisite being that the total number of ports of all of said ports is not less than 2(N−1);
   prioritizing said nodes according to the number of said communication ports and a transmission speed of said nodes when said prerequisite is satisfied, such that nodes of higher speed have higher priority than nodes of lower speed and nodes of equal speed are prioritized so that nodes having more of said communication ports have a higher priority than nodes having fewer of said communication ports;
   connecting a non-used port of the node of the highest priority with a port of the node of a next higher priority;
   repeating the connecting step until all of said nodes are connected together; and
   if no port remains in the node of the lowest priority to connect with the node of next priority during the repeating step, then separating the last connected node to assign to the node of the foremost priority among nodes in a next higher speed group than the separated last connected node, whereby said nodes are connected through said communication ports according to priority order.

4. A method as defined in claim 3, wherein the step of comparing determines that the prerequisite for constructing said topology is satisfied if the total port number of all of said nodes is equal to or greater than 2(N−1).

5. A method as defined in claim 3, wherein the step of prioritizing is performed so as to firstly assign higher priority to the node of greater transmission speed, and then to secondly assign higher priority to the node having greater number of said ports.

* * * * *